Patented Sept. 5, 1922.

1,428,057

UNITED STATES PATENT OFFICE.

NAPOLEON PETINOT, OF NEW YORK, N. Y.

PRODUCTION OF LOW-CARBON FERRO ALLOYS.

No Drawing.   Application filed September 26, 1919. Serial No. 326.605.

*To all whom it may concern:*

Be it known that I, NAPOLEON PETINOT, a citizen of the United States of America, and a resident of the city, county, and State of New York, have invented a certain new and useful Process for the Production of Low-Carbon Ferro Alloys, of which the following is a full, clear, and exact description.

This invention relates generally to the production of low carbon ferro-alloys, and, more particularly, it relates to a process for the production of low carbon ferro-chromium.

It has been a general practice of the art in producing low carbon ferro-alloys to treat a molten bath of a high carbon alloy with a metallic oxide which will react with the carbon and the high carbon alloy.

As a particular example of the practice of the art I may mention the method of making low carbon ferro-chromium which is usually carried out as follows: A quantity of ferro-chromium containing from 6% to 7% of carbon is melted in an electric furnace with burnt lime and chromium ore. During this melting process a reaction occurs between the oxides of the iron and chromium in the ore and the carbon in the alloy, with the result that the iron and chromium are reduced and taken up by the metal bath while the oxygen contained therein combines with the carbon in the high carbon alloy and escapes in the form of carbon monoxide gas. Any silicon which the alloy contains is also oxidized, thus forming silica which combines with lime and is thus slagged off. Obviously with the highly basic slag formed of lime used in this process the furnace must have a basic or neutral lining.

Methods similar to that above described have been used by the art for making other ferro alloys, which are low in carbon.

One of the objects of my invention has been to simplify the present methods of the art and to do away with the necessity of using lime or other slag forming substance in the furnace charge.

In carrying out my invention I use a suitable electric furnace provided with an acid lining, for example, a lining of silica. Into this furnace I put a quantity of the alloy, high in carbon, which it is desired to decarbonize and with this I mix a sufficient quantity of the deoxidizing agent so that the oxygen which it contains will be in excess of the amount required to combine with the carbon of the alloy. I do not add to this mixture any lime or other slag forming substance. The charge is melted rapidly, and, during the process of melting, the decarbonization takes place. At the same time a small protective cover of slag, consisting merely of silica derived from the acid lining, is formed.

A specific example of my process may be given in the case of producing low carbon ferro-chromium. In making this material in accordance with my invention a quantity of high carbon ferro-chromium is crushed and mixed with chromium ore (chromite), the amount of the latter being such that the oxygen existing in the combination with chromite and iron is in slight excess of that required to combine with the carbon contained in the high carbon ferro-chromium. This mixture without any other additions is then fed into the electric furnace provided with an acid (viz a silicious) lining and is melted down. The only slag formed is that derived from the impurities of the chromite and the silica derived from the reaction of the molten bath in the acid lining of the furnace.

It is of course to be understood that while I have described specifically how my invention may be employed in the production of low carbon ferro-chrome, it can with equal facility be used for the production of other low carbon ferro alloys and the appended claims should not be construed as applying only to the production of low carbon ferro-chromium alloys.

Having thus described my invention, what I claim is:

1. The process of producing low carbon ferro-alloys which consists in melting in an electric furnace high carbon ferro-alloys in the presence of an acid lining.

2. The process of producing low carbon ferro-alloys which consists in melting in an electric furnace high carbon ferro-alloys in contact with a metallic oxide and in the presence of an acid lining.

3. The process of producing low carbon ferro-alloys which consists in melting in an electric furnace a high carbon ferro-alloy in contact with a metallic oxide which contains oxygen in excess of the amount required to combine with the carbon of the alloy, and in the presence of an acid lining.

4. The process of producing a low carbon ferro-chromium which consists in melting in an electric furnace a high carbon ferro-chromium alloy in contact with chromite and in the presence of an acid lining.

5. The process of producing a low carbon ferro-chromium which consists in melting, in an electric furnace, a high carbon ferro-chromium alloy in contact with the chromite ore which contains oxygen in excess of the amount required to combine with the carbon alloy, and in the presence of an acid lining.

6. The process of producing low carbon ferro-alloys which consists in crushing a high carbon ferro-alloy and mixing it with a quantity of a metallic oxide which contains oxygen in excess of the amount required to combine with the carbon of the alloy, and then charging this mixture into an electric furnace and then melting the mixture in the presence of an acid lining.

7. The process of producing a low carbon ferro-chromium and mixing it with a quantity of chromite ore which contains oxygen in excess of the amount required to combine with the carbon of the alloy and then charging this mixture into an electric furnace and then melting the same in the presence of an acid lining.

In testimony whereof, I have hereunto signed my name.

NAPOLEON PETINOT.